R. H. FAY.
WORK CENTERING DEVICE FOR USERS OF LATHES.
APPLICATION FILED OCT. 28, 1907.
994,581.
Patented June 6, 1911.
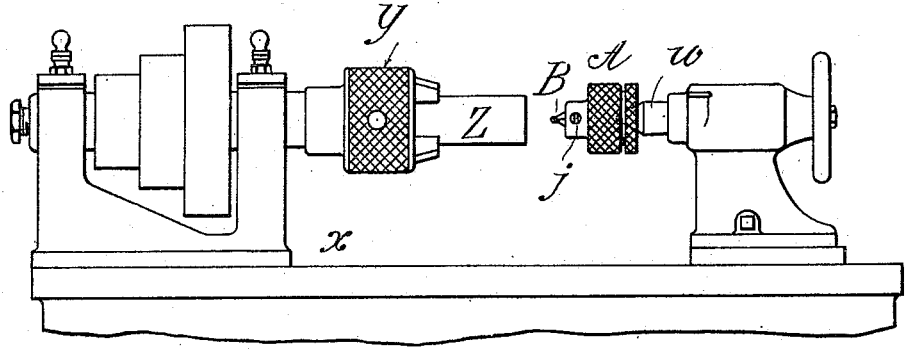
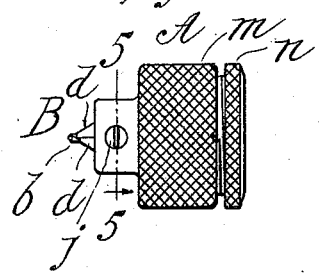
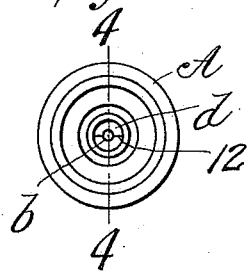
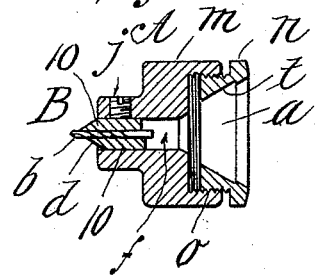
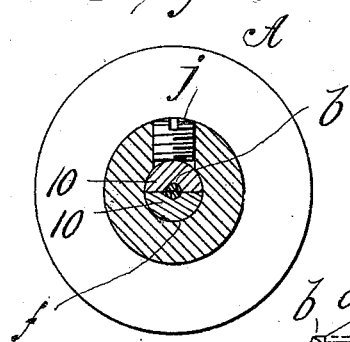
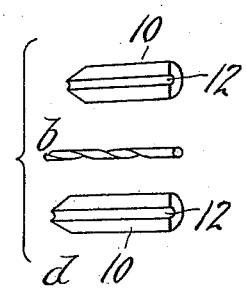
Witnesses:
H. L. Sprague
R. M. Mowry
Inventor,
Robert H. Fay,
by
Attorney.

UNITED STATES PATENT OFFICE.

ROBERT H. FAY, OF CHICOPEE FALLS, MASSACHUSETTS.

WORK-CENTERING DEVICE FOR USERS OF LATHES.

994,581. Specification of Letters Patent. Patented June 6, 1911.

Application filed October 28, 1907. Serial No. 399,519.

*To all whom it may concern:*

Be it known that I, ROBERT H. FAY, a citizen of the United States of America, and resident of Chicopee Falls, in the county of Hampden and State of Massachusetts, have invented certain new and useful Improvements in Work-Centering Devices for Users of Lathes, of which the following is a full, clear, and exact description.

The present invention resides in a small, generally circular device for making the conical hole in a piece of work chucked at the head stock of a lathe, into which conical hole in the work, and at the dead center of the lathe may be thereafter engaged the conical extremity of the tail stock center or "dead center."

By the employment of the present device the centering of a piece of work may be performed not only much easier, but also much quicker than has heretofore been generally possible in pursuance of the heretofore known machine shop expedients.

The invention furthermore comprises an improved drill point and reaming tool having certain practical advantages as will be hereinafter rendered apparent.

The improved centering device is illustrated in the accompanying drawings in which,—

Figure 1 is a side elevation showing the manner of utilizing the device in connection with a piece of work chucked in a lathe. Fig. 2 is a side elevation of the device on a larger scale. Fig. 3 is a front end view, and Fig. 4 is a longitudinal section as taken on line 4—4, Fig. 3. Fig. 5 is a very much enlarged cross sectional view taken on line 5—5, Fig. 2. Fig. 6 is a perspective view of the parts constituting the improved combined drill and reamer. Fig. 7 is a side elevation of the combined drill and reamer.

Similar characters of reference indicate corresponding parts in all of the views.

The device consists of a substantially cylindrical body A, preferably milled or roughened peripherally whereby the same may be manually held against rotation, having at the rear end thereof a conical socket *a* and having at its other end in axial alinement with said socket a forwardly extending tool B for producing a conical centering hole in a rotatively carried piece of work.

In Fig. 1, *x* represents a lathe of very common form, of which *y* is a chuck rotatively carried at the head stock for carrying the work to be turned or otherwise operated upon in the lathe,—*z* representing the latter.

*w* represents the tail stock spindle or dead center, understood as having, as usual, the conical end projecting toward the head stock.

The tool for producing the conical center hole in the proper location in the end of the piece of work carried in the lathe chuck comprises a drilling point *b* and a reamer *d*,—the cutting edge of which is to the rear of the drill point; and this combined drill and reamer is fitted and held in an axial cylindrical bore *f* in the forward portion of the body A of the device.

In using the device to produce the conical socket or "center" in the work, into which thereafter the "dead center" *w* of the lathe tail stock may be engaged, it is only necessary for the machinist, after having run the tail stock in proper proximity to the end of the work, to engage the device by its conical rear end on the dead center *w*,—the device naturally centering itself axially by reason of the conical socket *a* seating itself on the tapered end of the part *w*. Now while the work is rotating, the tail stock is run up so that the removably held drill and reamer successively operate to produce a centering hole in the end of the work, whereupon the tail stock is run slightly back to enable the person to disengage and remove the device from the work and from the dead center and then the tail stock is run up to bring its part *w* in centering and holding relation to the work. This operation manifestly may be performed much more quickly than that heretofore followed in mounting a reaming and drilling tool in a chuck or holder therefor in the tail stock spindle with necessity of imparting comparatively long movements back and forth to the tail stock, of stopping to take out the drill and reamer from the tail stock and having to then substitute therefor the dead center.

Inasmuch as the taper of the dead centers of different lathes may be varied as to acuteness and also sometimes as to a departure from a true tapering form, as, for instance by being conoidal, I find it advantageous to construct the portion of the body A in which the conical rearwardly opening socket is formed, in two sections *m* and *n*, as particularly represented in Figs. 2 and 4, one of which is axially adjustable relatively to the other by screw thread engagements as shown at *o*. I also find it advantageous to free out or rabbet the wall of the conical socket *a* between the inner end and the mouth of such socket, as represented at *t* in Fig. 4, as conducing to the more ready and accurate seating of the centering device on lathe dead centers of variable tapers. By referring to Fig. 4, it will be observed that the projection of the reaming tool forward of the body, is less in extent than the depth of the conical socket *a*. In other words the seating depth of the body exceeds the length of the cutting parts.

The combined drill and reamer as shown consists of the drill *b* and a plurality,—preferably no more than two,—of segmental members 10, 10, having longitudinal grooves 12 along their inner sides and slabbed faces for a clamping fit about the shank of the drill, and having their forward extremities inclined from their outer walls forwardly and inwardly toward the axial center, the so formed end portion of one segmental member being endwise overlapped beyond the corresponding end portion of the other member to constitute a ream cutting edge 12 as more clearly represented in Fig. 7. The ream centers 10, 10, and the drill in their combined relations are held clamped in the bore *f* of the body A by the binding screw *j*.

When a ream edge becomes broken, worn or dull, it is not necessary to discard the entire combined drill and reaming tool, for it is entirely practicable and convenient, by loosening the screw *j* to remove the tool in its entirety, to grind the segmental ream tool sections and replace them in their proper relations to each other and to the drill for continued usage; and many repeated grindings of the ream segments may be performed as manifest; and again it is entirely practicable to replace a worn out drill for another as occasion may require.

I claim:—

1. A centering device consisting of a cylindrical body having a conical centering socket forming tool at and forwardly extended beyond the forward end, and having an axially located conical tail stock center receiving opening in the rear portion thereof, such portion of the body comprising such opening being constructed in sections, one of which is axially adjustable relatively to the other.

2. A centering device composed of a short body having a conical socket at its rear end of sufficient depth to receive the tail stock spindle and by manual holding of the body prevent lateral play of the device with respect thereto, said body having a bore in its front end, a plurality of members secured in said bore and formed with drill holding slots and a drill in said slots projecting beyond the front end of the body, the extent of projection of the drill with respect to the body being less than the depth of the conical socket.

Signed by me at Springfield, Mass., in presence of two subscribing witnesses.

ROBERT H. FAY.

Witnesses:
 WM. S. BELLOWS,
 G. R. DRISCOLL.

---

Copies of this patent may be obtained for five cents each, by addressing the "Commissioner of Patents, Washington, D. C."